United States Patent
Lee

(10) Patent No.: US 8,470,460 B2
(45) Date of Patent: Jun. 25, 2013

(54) MULTILAYER THERMAL BARRIER COATINGS

(75) Inventor: Kang N. Lee, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 760 days.

(21) Appl. No.: 12/624,894

(22) Filed: Nov. 24, 2009

(65) Prior Publication Data

US 2010/0136349 A1    Jun. 3, 2010

Related U.S. Application Data

(60) Provisional application No. 61/117,781, filed on Nov. 25, 2008.

(51) Int. Cl.
| | |
|---|---|
| *B32B 9/00* | (2006.01) |
| *B32B 15/04* | (2006.01) |
| *B32B 19/00* | (2006.01) |
| *F03D 11/02* | (2006.01) |
| *F04D 29/38* | (2006.01) |
| *B64C 11/16* | (2006.01) |
| *F01D 5/14* | (2006.01) |

(52) U.S. Cl.
USPC ........ 428/702; 416/241 B; 428/469; 428/471; 428/472; 428/701

(58) Field of Classification Search
USPC ....... 428/469, 471, 472, 701, 702; 416/241 B
See application file for complete search history.

(56) References Cited

U.S. PATENT DOCUMENTS

| | | | |
|---|---|---|---|
| 3,962,059 | A | 6/1976 | Kaup et al. |
| 4,094,673 | A | 6/1978 | Erickson et al. |
| 4,386,968 | A | 6/1983 | Hinkel et al. |
| 4,588,607 | A | 5/1986 | Matarese et al. |
| 4,914,794 | A | 4/1990 | Strangman |
| 4,996,117 | A | 2/1991 | Chu et al. |
| 5,320,909 | A | 6/1994 | Scharman et al. |
| 5,350,599 | A | 9/1994 | Rigney et al. |
| 5,660,885 | A | 8/1997 | Hasz et al. |

(Continued)

FOREIGN PATENT DOCUMENTS

| | | |
|---|---|---|
| EP | 1 400 611 A1 | 3/2004 |
| EP | 1479661 A2 | 11/2004 |

(Continued)

OTHER PUBLICATIONS

Extended European Search Report from the European Patent Office dated Feb. 2, 2010 for corresponding European Patent Application No. EP09177086.7-2122, 8 pgs.

(Continued)

*Primary Examiner* — Jonathan Langman
(74) *Attorney, Agent, or Firm* — Shumaker & Sieffert, P.A.

(57) ABSTRACT

A multilayer thermal barrier coating (TBC) may include a plurality of layers selected to provide properties to the multilayer TBC. For example, a multilayer TBC may include a first layer deposited over a substrate, a second layer deposited over the first layer and a third layer deposited over the second layer. The first layer may be selected to provide thermal cycling resistance, the second layer may be selected to provide low thermal conductivity and the third layer may be selected to provide at least one of erosion resistance and CMAS degradation resistance. The multilayer TBC may also include two layers, or more than three layers.

21 Claims, 4 Drawing Sheets

U.S. PATENT DOCUMENTS

| | | | |
|---|---|---|---|
| 5,704,759 | A | 1/1998 | Draskovich et al. |
| 5,714,202 | A | 2/1998 | Lemelson et al. |
| 5,773,141 | A | 6/1998 | Hasz et al. |
| 5,851,678 | A | 12/1998 | Hasz et al. |
| 5,869,146 | A | 2/1999 | McCluskey et al. |
| 5,871,820 | A | 2/1999 | Hasz et al. |
| 5,914,189 | A | 6/1999 | Hasz et al. |
| 6,057,047 | A | 5/2000 | Maloney |
| 6,261,643 | B1 | 7/2001 | Hasz et al. |
| 6,299,988 | B1 | 10/2001 | Wang et al. |
| 6,465,090 | B1 | 10/2002 | Stowell et al. |
| 6,468,648 | B1 | 10/2002 | McCluskey et al. |
| 6,562,409 | B2 | 5/2003 | Koshkarian et al. |
| 6,627,323 | B2 | 9/2003 | Williams et al. |
| 6,720,038 | B2 | 4/2004 | Darolia et al. |
| 6,723,674 | B2 | 4/2004 | Wang et al. |
| 6,733,908 | B1 | 5/2004 | Lee et al. |
| 6,759,151 | B1 | 7/2004 | Lee |
| 6,787,195 | B2 | 9/2004 | Wang et al. |
| 6,812,176 | B1 | 11/2004 | Zhu et al. |
| 6,835,465 | B2 | 12/2004 | Allen et al. |
| 6,887,528 | B2 | 5/2005 | Lau et al. |
| 6,887,595 | B1 | 5/2005 | Darolia et al. |
| 6,890,668 | B2 | 5/2005 | Bruce et al. |
| 6,893,750 | B2 | 5/2005 | Nagaraj et al. |
| 6,902,836 | B2 | 6/2005 | Eaton et al. |
| 6,933,061 | B2 | 8/2005 | Nagaraj et al. |
| 6,933,066 | B2 | 8/2005 | Nagaraj et al. |
| 7,008,674 | B2 | 3/2006 | Nagaraj et al. |
| 7,063,894 | B2 | 6/2006 | Sun et al. |
| 7,186,466 | B2 | 3/2007 | Zhu et al. |
| 7,226,668 | B2 | 6/2007 | Nagaraj et al. |
| 7,354,651 | B2 | 4/2008 | Hazel et al. |
| 7,374,818 | B2 | 5/2008 | Bhatia et al. |
| 7,374,825 | B2 | 5/2008 | Hazel et al. |
| 7,595,114 | B2 | 9/2009 | Meschter et al. |
| 7,666,512 | B2 | 2/2010 | Bhatia et al. |
| 7,695,830 | B2 | 4/2010 | Strangman et al. |
| 7,968,217 | B2 | 6/2011 | Sarrafi-Nour et al. |
| 2002/0098391 | A1 | 7/2002 | Tanaka et al. |
| 2003/0113553 | A1 | 6/2003 | Sun et al. |
| 2003/0113559 | A1 | 6/2003 | Eaton et al. |
| 2003/0138658 | A1 | 7/2003 | Taylor et al. |
| 2004/0038085 | A1 | 2/2004 | Litton et al. |
| 2004/0115351 | A1 | 6/2004 | Lau et al. |
| 2004/0151840 | A1 | 8/2004 | Wang et al. |
| 2004/0170849 | A1 | 9/2004 | Ackerman et al. |
| 2005/0003175 | A1 | 1/2005 | Nygard et al. |
| 2005/0129511 | A1 | 6/2005 | Allen |
| 2005/0129973 | A1 | 6/2005 | Eaton et al. |
| 2005/0164027 | A1 | 7/2005 | Lau et al. |
| 2006/0014029 | A1 | 1/2006 | Saak et al. |
| 2006/0024513 | A1 | 2/2006 | Schlichting et al. |
| 2006/0024527 | A1 | 2/2006 | Schlichting et al. |
| 2006/0073361 | A1 | 4/2006 | Fukudome et al. |
| 2006/0078750 | A1 | 4/2006 | Zhu et al. |
| 2006/0115661 | A1 | 6/2006 | Hazel et al. |
| 2006/0154093 | A1 | 7/2006 | Meschter et al. |
| 2006/0166018 | A1 | 7/2006 | Spitsberg et al. |
| 2006/0210800 | A1 | 9/2006 | Spitsberg et al. |
| 2006/0280952 | A1 | 12/2006 | Hazel et al. |
| 2006/0280953 | A1 | 12/2006 | Hazel et al. |
| 2006/0280954 | A1 | 12/2006 | Spitsberg et al. |
| 2006/0280955 | A1 | 12/2006 | Spitsberg et al. |
| 2006/0280963 | A1 | 12/2006 | Hazel et al. |
| 2007/0014996 | A1 | 1/2007 | Bhatia et al. |
| 2007/0082131 | A1 | 4/2007 | Doesburg et al. |
| 2007/0119713 | A1 | 5/2007 | Hasz |
| 2007/0141367 | A1 | 6/2007 | Darolia et al. |
| 2007/0184204 | A1 | 8/2007 | Balagopal et al. |
| 2008/0124479 | A1 | 5/2008 | Hazel et al. |
| 2008/0145674 | A1 | 6/2008 | Darolia et al. |
| 2008/0274336 | A1 | 11/2008 | Merrill et al. |
| 2009/0102008 | A1 | 4/2009 | Kakehata |
| 2009/0162556 | A1 | 6/2009 | Boutwell et al. |
| 2009/0169914 | A1 | 7/2009 | Fu et al. |
| 2009/0176059 | A1* | 7/2009 | Namba et al. ............ 428/155 |
| 2009/0184280 | A1 | 7/2009 | Lee |
| 2009/0186237 | A1 | 7/2009 | Lee |
| 2010/0080984 | A1 | 4/2010 | Lee |
| 2010/0129636 | A1 | 5/2010 | Cybulsky et al. |
| 2010/0159150 | A1 | 6/2010 | Kirby et al. |
| 2011/0033630 | A1 | 2/2011 | Naik et al. |

FOREIGN PATENT DOCUMENTS

| | | | |
|---|---|---|---|
| EP | 1626039 | A2 | 2/2006 |
| EP | 1666638 | A1 | 6/2006 |
| EP | 1 806 435 | A2 | 7/2007 |
| EP | 1829847 | A2 | 9/2007 |
| EP | 1 806 435 | A3 | 4/2008 |
| EP | 1975258 | A1 | 10/2008 |
| EP | 2108715 | A2 | 10/2009 |
| EP | 2189504 | A1 | 5/2010 |
| EP | 2192098 | A2 | 6/2010 |
| EP | 2194164 | A1 | 6/2010 |
| EP | 2208805 | A1 | 7/2010 |
| EP | 2287131 | A2 | 2/2011 |
| EP | 2287138 | A2 | 2/2011 |
| GB | 2319248 | A | 5/1998 |
| WO | 2006023894 | A2 | 3/2006 |
| WO | WO-2007-116547 | * | 10/2007 |
| WO | 2008103163 | A2 | 8/2008 |
| WO | 2008109214 | A2 | 9/2008 |
| WO | 2009091721 | A2 | 7/2009 |
| WO | 2010039699 | A3 | 4/2010 |

OTHER PUBLICATIONS

Office Action from U.S. Appl. No. 12/624,938, dated Apr. 5, 2011, 25 pp.

Response to Office Action dated Apr. 5, 2011, from U.S. Appl. No. 12/624,938, filed Jul. 5, 2011, 15 pp.

Office Action from U.S. Appl. No. 12/016,589, dated Jun. 10, 2011, 9 pp.

Notice of Appeal and Request for Review for U.S. Appl. No. 12/016,589, filed Sep. 12, 2011, 5 pp.

Lee et al., "Rare earth silicate environmental barrier coatings for Si/C/SiC composites and Si3N4 ceramics," Journal of the European Ceramic Society 25: 1705-1715, 2005.

U.S. Appl. No. 61/231,510, filed Aug. 5, 2009.

U.S. Appl. No. 61/318,567, filed Mar. 29, 2010.

U.S. Appl. No. 61/329,758, filed Apr. 30, 2010.

Office Action from U.S. Appl. No. 12/016,649, dated Sep. 28, 2012, 14 pp.

Shelby et al., "Rare earth Aluminosilicate glasses," Journal of American Ceramic Society, vol. 73, No. 1, 1990, pp. 39-42.

Office Action from corresponding European application No. 09177086.7, dated Jan. 11, 2011, 4 pp.

Office Action from corresponding Singapore application No. 200907911-2, mailed Jan. 21, 2011, 12 pp.

Office Action from U.S. Appl. No. 12/016,589, dated Dec. 21, 2010, 10 pp.

Response to Office Action dated Dec. 21, 2010, from U.S. Appl. No. 12/016,589, filed Mar. 21, 2011, 11 pp.

U.S. Appl. No. 61/367,067, by Kang N. Lee, filed Jul. 23, 2010.

Office Action from the Intellectual Property Office of Singapore (IPOS) with Invitation to Respond to the Search Report and Written Opinion for corresponding Singapore application No. 200907911-2, dated Sep. 13, 2011, 8 pp.

Response to Office Action dated Sep. 28, 2012, from U.S. Appl. No. 12/016,649, filed Dec. 26, 2012, 17 pp.

Official Action dated Oct. 26, 2011 from the Canadian Intellectual Property Office for corresponding Canadian application No. 2.686,328, 2 pages.

* cited by examiner

MULTILAYER THERMAL BARRIER COATINGS

This application claims priority from U.S. Provisional Application Ser. No. 61/117,781 filed Nov. 25, 2008, the entire content of which is incorporated herein by reference.

TECHNICAL FIELD

The present disclosure relates to thermal barrier coatings.

BACKGROUND

The components of high-temperature mechanical systems, such as, for example, gas-turbine engines, must operate in severe environments. For example, the high-pressure turbine blades and vanes exposed to hot gases in commercial aeronautical engines typically experience metal surface temperatures of about 1000° C., with short-term peaks as high as 1100° C.

Typical components of high-temperature mechanical systems include a Ni or Co-based superalloy substrate. The substrate can be coated with a thermal barrier coating (TBC) to reduce surface temperatures. The thermal barrier coating may include a thermally insulative ceramic topcoat, and may be bonded to the substrate by an underlying metallic bond coat.

The TBC, usually applied either by air plasma spraying or electron beam physical vapor deposition, is most often a layer of yttria-stabilized zirconia (YSZ) with a thickness of about 100-500 µm. The properties of YSZ include low thermal conductivity, high oxygen permeability, and a relatively high coefficient of thermal expansion. The YSZ TBC is also typically made "strain tolerant" and the thermal conductivity further lowered by depositing a structure that contains numerous pores and/or pathways.

SUMMARY

In general, the present disclosure is directed to a multilayer thermal barrier coating (TBC) including a plurality of layers. The multilayer TBC may include two or more layers, each of which is selected to provide one or more properties to the multilayer TBC. For example, each of the plurality of layers may be selected to provide at least one of low thermal conductivity, erosion resistance, thermal cycling resistance, and CMAS degradation resistance to the multilayer TBC. In some embodiments, the multilayer TBC may include three layers.

In some embodiments, at least one of the plurality of layers of the multilayer TBC may be selected from yttria-stabilized zirconia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof.

In one aspect, the present disclosure is directed to a thermal barrier coating including a first layer deposited over a substrate, a second layer deposited over the first layer, and a third layer deposited over the second layer. The first layer may provide high thermal-cycling resistance, the second layer may provide low thermal conductivity and the third layer may provide at least one of erosion resistance and CMAS degradation resistance.

In another aspect, the present disclosure is directed to an article including a substrate and a thermal barrier coating deposited over the substrate. The thermal barrier coating includes a first layer deposited over the substrate, a second layer deposited over the first layer and a third layer deposited over the second layer. The first layer may provide high thermal-cycling resistance, the second layer may provide low thermal conductivity and the third layer may provide at least one of erosion resistance and CMAS degradation resistance.

In another aspect, the present disclosure is directed to a multilayer thermal barrier coating including a first layer comprising either 7-8 YSZ (zirconium oxide ($ZrO_2$) including about 7 wt. % to about 8 wt. % yttrium oxide ($Y_2O_3$)) or a base oxide including at least one of zirconia and hafnia, a primary dopant comprising ytterbia, a first co-dopant comprising samaria, and a second co-dopant comprising at least one of lutetia, Scandia, ceria, gadolinia, neodymia and europia. The first layer comprises a first phase constitution selected from a metastable tetragonal phase constitution and a cubic phase constitution. The multilayer thermal barrier coating also includes a second layer deposited over the first layer. The second layer comprises a base oxide comprising at least one of zirconia and hafnia, a primary dopant comprising ytterbia, a first co-dopant comprising samaria, and a second co-dopant comprising at least one of lutetia, Scandia, ceria, gadolinia, neodymia and europia. The second layer comprises a second phase constitution selected from the metastable tetragonal phase constitution and the cubic phase constitution, and the second phase constitution is different than the first phase constitution.

In yet another aspect, the present disclosure is directed to a multilayer thermal barrier coating including a first layer deposited over a substrate, a multilayer intermediate layer deposited over the first layer, and a top layer deposited over the multilayer intermediate layer. The first layer provides high thermal-cycling resistance, the multilayer intermediate layer provides at least one of low thermal conductivity and/or erosion resistance, and the top layer provides at least one of low thermal conductivity, erosion resistance, thermal cycling resistance, and CMAS degradation resistance.

The details of one or more embodiments are set forth in the accompanying drawings and the description below. Other features, objects, and advantages will be apparent from the description and drawings, and from the claims.

DETAILED DESCRIPTION

Figure 1:
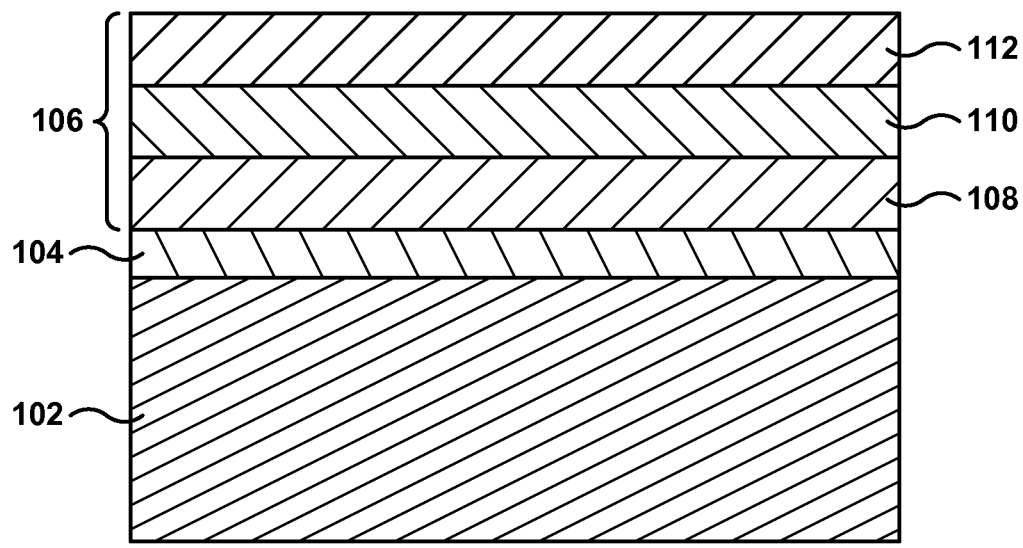
FIG. 1 is a cross-sectional diagram illustrating an example article including a multilayer thermal barrier coating deposited over a bond coat, which is deposited over a substrate.

As gas turbine inlet temperatures continue to increase, new thermal barrier coatings (TBCs) are required with better high temperature performance. Higher turbine inlet temperatures are detrimental to conventional TBC performance as yttria (yttrium oxide)-stabilized zirconia (YSZ) may sinter significantly at temperatures above about 1200° C. Sintering reduces the porosity of the YSZ TBC, which may lead to increased thermal conductivity and reduced strain tolerance. Increased thermal conductivity results in the substrate over which the TBC is deposited being exposed to higher temperatures, which increases the strain on the substrate and lowers the useful life of the component to which the TBC is applied.

The reduced strain tolerance of the TBC due to sintering may also reduce the useful life of the component. For example, thermal cycling experienced by the component (e.g., ambient temperature when gas turbine is off, high temperature spike when gas turbine is turned on, continuous high temperatures during operation) exerts large stresses on the component due to thermal expansion and contraction. The porosity of the TBC provides strain tolerance; reduced porosity due to sintering reduces the strain tolerance of the TBC and may compromise the mechanical stability of the TBC and/or TBC-bond coat interface.

Higher turbine inlet temperatures may also lead to degradation of the TBC through a reaction with CMAS, a calcia-magnesia-alumina-silicate deposit resulting from the ingestion of siliceous minerals (dust, sand, volcanic ashes, runway debris, and the like) with the intake of air in gas turbine engines. Typical CMAS deposits have a melting point of about 1200° C. to about 1250° C. (about 2200° F. to about 2300° F.). As advanced engines run at TBC surface temperatures above the CMAS melting point, molten CMAS can penetrate microstructural features (e.g., pores) in the TBC that provide strain tolerance, leading to a loss of strain tolerance and an increase in the thermal conductivity. Another mode of degradation by CMAS is chemical: a reaction between CMAS and yttria in the TBC may occur, preferentially along grain boundaries, leading to the destabilization of YSZ by precipitating monoclinic zirconia ($ZrO_2$) with lower yttria content. Both CMAS penetration and YSZ destabilization may result in a shorter life before failure of the component due to higher thermal stresses.

Additionally, because the TBC typically includes a surface that is exposed to turbine gases, the TBC may be impacted by debris that enters the gas turbine engine or other high-temperature mechanical system in which the TBC is utilized. Thus, it may be desired that the TBC includes materials with relatively high fracture toughness, which leads to resistance to mechanical damage, such as erosion by debris.

Each of these considerations: thermal cycling resistance, erosion resistance, thermal conductivity and CMAS degradation resistance, when considered individually, may lead to selection of a material or materials that compromise one or more of the other considerations. For example, a first material with desirably low thermal conductivity may possess relatively poor thermal cycling resistance and erosion resistance. As another example, a second material with desirable erosion resistance and thermal cycling resistance may possess relatively poor CMAS degradation resistance.

In general, the present disclosure is directed to a multilayer thermal barrier coating (TBC). In some embodiments, the multilayer TBC may include two or more layers. Each of the layers contributes to the properties of the multilayer TBC, and each layer may be selected independently to provide similar or different properties to the multilayer TBC. For example, the multilayer TBC may include three layers, and a first layer, which is deposited over a substrate, may be selected to provide thermal cycling resistance (e.g., a long thermal cycling life). As used herein, thermal cycling resistance is defined as thermal cycling resistance comparable to or greater than the thermal cycling resistance of zirconium oxide stabilized by about 7 wt. % to about 8 wt. % yttrium oxide (7-8 YSZ). A second layer, which is deposited over the first layer, may be selected to provide low thermal conductivity. As used herein, low thermal conductivity is defined as thermal conductivity that is lower than the thermal conductivity of 7-8 YSZ, which may be about 1.8 W/m-K when deposited by EB-PVD. A third layer, which is deposited over the second layer, may be selected to provide at least one of erosion resistance and CMAS degradation resistance. In addition to the properties of the first, second and third layers described above, each of the layers may contribute to the low effective thermal conductivity of the multilayer TBC.

In some embodiments, the multilayer TBC may include more than three layers. For example, a multilayer TBC may include a first layer that is selected to provide thermal cycling resistance, a second layer that is selected to provide low thermal conductivity, a third layer that is selected to provide erosion resistance, and a fourth layer that is selected to provide CMAS degradation resistance. Other combinations of layers are also possible, and the order of the layers may be different from those described herein.

In many embodiments, it may be desired that the first layer, which is deposited over the substrate, provides thermal cycling resistance and the top layer (e.g., the layer exposed to the environment; the third layer in a three-layer TBC) provides at least one of erosion resistance and CMAS degradation resistance. Any intermediate layers located between the first layer and the top layer may provide any of the characteristics described herein, and may be deposited over the first layer in any order. Further, the multilayer TBC may include any number of intermediate layers, including no intermediate layers. In some embodiments, a multilayer TBC that includes more layers may provide better thermal protection to the substrate than a multilayer TBC that include fewer layers. While not wishing to be bound by any theory, currently available evidence indicates that this is due to phonon and/or photon scattering at the layer interfaces, which lowers the effective thermal conductivity of the multilayer TBC.

FIG. 1 illustrates a cross-sectional view of an exemplary article 100 used in a high-temperature mechanical system. Article 100 may include a bond coat 104 deposited over a substrate 102 and a multilayer TBC 106 deposited over bond coat 104. In the embodiment illustrated in FIG. 1, multilayer TBC 106 may include a first layer 108, a second layer 110 and a third layer 112. However, as described above, in other embodiments, multilayer TBC 106 may include more than three layers, such as, for example, four layers, as will be described in further detail below with reference to FIG. 6, or as many layers as practicable with available process methods, as will be described in further detail below with reference to FIG. 8.

In some embodiments, as illustrated in FIG. 1, multilayer TBC 106 may be deposited directly on bond coat 104. In other embodiments, multilayer TBC 106 may be deposited over or be deposited directly on substrate 102, with or without bond coat 104. As used herein, "deposited over" is defined as a layer or coating that is deposited on top of another layer or coating, and encompasses both a first layer or coating deposited immediately adjacent a second layer or coating and a first layer or coating deposited on top of a second layer or coating with one or more intermediate layer or coating present between the first and second layers or coatings. In contrast, "deposited directly on" denotes a layer or coating that is deposited immediately adjacent another layer or coating, i.e., there are no intermediate layers or coatings.

Substrate 102 may be a component of a high temperature mechanical system, such as, for example, a gas turbine engine or the like. In some embodiments, substrate 102 may include a superalloy, such as a superalloy based on Ni, Co, Ni/Fe, and the like. A substrate 102 including a superalloy may include other additive elements to alter its mechanical properties, such as toughness, hardness, temperature stability, corrosion resistance, oxidation resistance, and the like, as is well known in the art. Any useful superalloy may be utilized for substrate 102, including, for example, those available from Martin-Marietta Corp., Bethesda, Md., under the trade designation MAR-M247; those available from Cannon-Muskegon Corp., Muskegon, Mich., under the trade designations CMSX-4 and CMXS-10; and the like.

In other embodiments, substrate 102 may include a ceramic or ceramic matrix composite (CMC). A substrate 102 including a ceramic or CMC may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The filler composition, shape, size, and the like may be selected to provide the desired properties to the CMC. For example, the filler material may be chosen to increase the toughness of a brittle ceramic matrix. The filler may also be chosen to provide thermal conductivity, electrical conductivity, thermal expansion, hardness, or the like to the CMC.

In some embodiments, the filler composition may be the same as the ceramic matrix material. For example, a silicon carbide matrix may surround silicon carbide whiskers. In other embodiments, the filler material may include a different composition than the ceramic matrix, such as aluminum silicate fibers in an alumina matrix, or the like. One preferred CMC includes silicon carbide continuous fibers embedded in a silicon carbide matrix.

Some example ceramics and CMCs which may be used for substrate 102 include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics.

Bond coat 104 may be deposited over or deposited directly on substrate 102. Bond coat 104 may improve adhesion between multilayer TBC 106 and substrate 102. In embodiments in which substrate 102 includes a superalloy, bond coat 104 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3$Al nickel aluminide alloy (either unmodified or modified by Pt, Cr, Hf, Zr, Y, Si, and combinations thereof), or the like.

In other embodiments, bond coat 104 may include ceramics or other materials that are compatible with a substrate 102 that includes a ceramic or CMC. For example, bond coat 104 may include mullite (aluminum silicate, $Al_6Si_2O_{13}$), silica, silicides, silicon, or the like. Bond coat 104 may further include other ceramics, such as rare earth silicates including lutetium (Lu) silicates, ytterbium (Yb) silicates, thulium (Tm) silicates, erbium (Er) silicates, holmium (Ho) silicates, dysprosium (Dy) silicates, gadolinium (Gd) silicates, terbium (Tb) silicates, europium (Eu) silicates, samarium (Sm) silicates, promethium (Pm) silicates, neodymium (Nd) silicates, praseodymium (Pr) silicates, cerium (Ce) silicates, lanthanum (La) silicates, yttrium (Y) silicates, scandium (Sc) silicates, or the like. Some preferred compositions of a bond coat 104 for depositing over a CMC substrate 102 include silicon, mullite, and ytterbium silicate.

Bond coat 104 may be selected based on a number of considerations, including the chemical composition and phase constitution of multilayer TBC 106 (e.g., first layer 108) and substrate 102. For example, when substrate 102 includes a superalloy with a γ-Ni+γ'-$Ni_3$Al phase constitution, bond coat 104 preferably includes a γ-Ni+γ'-$Ni_3$Al phase constitution to better match the coefficient of thermal expansion of substrate 102, and therefore increase the mechanical stability (adhesion) of bond coat 104 to substrate 102. Alternatively, when substrate 102 includes a CMC, bond coat 104 preferably includes silicon and/or a ceramic, such as, for example, mullite or a rare earth silicate.

In some embodiments, bond coat 104 may include multiple layers. A bond coat 104 that includes multiple layers may be desirable because each layer may perform a separate function. For example, in some embodiments in which substrate 102 is a CMC including silicon carbide, a bond coat 104 including a first layer of silicon may be deposited on substrate 102, followed by the deposition of a second layer including mullite or a rare earth silicate. The silicon layer may provide bonding while the ceramic layer provides a gradual transition of thermal expansion and prevents water vapor from reaching the silicon layer.

Figure 2:
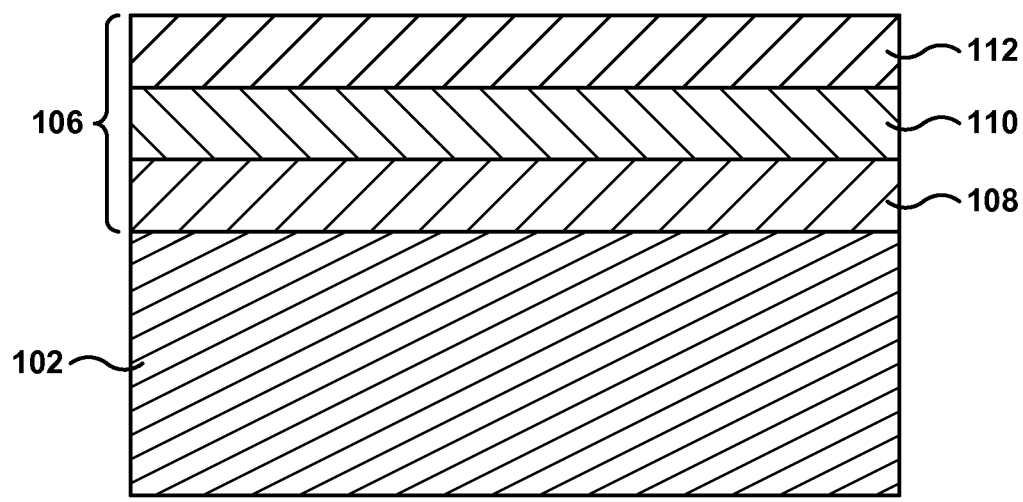
FIG. 2 is a cross-sectional diagram illustrating an example article including a multilayer thermal barrier coating deposited directly on a substrate.

In other embodiments, article 100 may not include a bond coat 104. For example, in some embodiments, as illustrated in FIG. 2, an article 200 may include multilayer TBC 106 in which first layer 108 is deposited directly on substrate 102. Bond coat 104 may not be required or desired when multilayer TBC 106 and substrate 102 are chemically and/or mechanically compatible. For example, in embodiments in which first layer 108 of multilayer TBC 106 and substrate 102 adhere sufficiently strongly to each other, a bond coat 104 may not be necessary.

Figure 3:
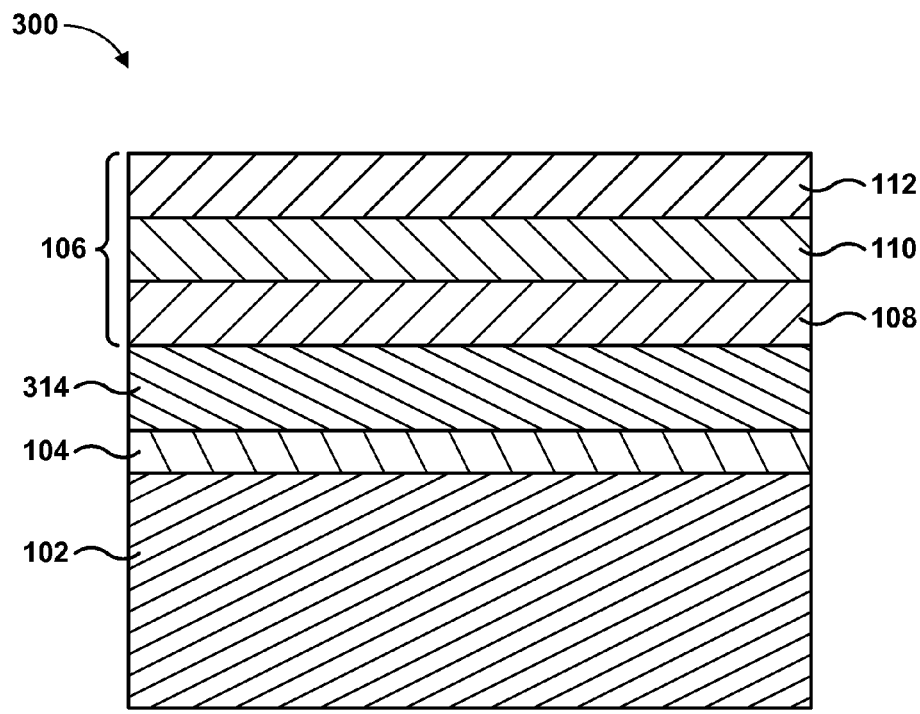
FIG. 3 is a cross-sectional diagram illustrating an example article including a multilayer thermal barrier coating deposited over an environmental barrier coating.

As illustrated in FIG. 3, an article 300 may also include an environmental barrier coating (EBC) 314 deposited over or deposited directly on bond coat 104. In this embodiment, multilayer TBC 106 is deposited over or deposited directly on EBC 314. EBC 314 may provide at least one of water vapor stability, chemical stability, and environmental durability to a substrate 102 that includes, for example, a ceramic or CMC. EBC 314 may include, for example, a rare earth silicate, barium strontium alumina silicate (BaO—SrO—$Al_2O_3$-$2SiO_2$; BSAS), barium alumina silicate (BaO—$Al_2O_3$-$2SiO_2$; BAS), strontium alumina silicate (SrO—$Al_2O_3$-$2SiO_2$; SAS), calcium alumina silicate (CaO—$Al_2O_3$-$2SiO_2$; CAS), magnesium alumina silicate (MgO—$Al_2O_3$-$2SiO_2$; MAS) and lithium alumina silicate ($Li_2O$—$Al_2O_3$-$2SiO_2$; LAS); and the like.

In alternative embodiments (not pictured), EBC 314 may be deposited directly on substrate 102, which may include a ceramic or CMC. In these embodiments, EBC 314 may increase adhesion between multilayer TBC 106 and substrate 102, similar to bond coat 104. A preferred EBC 314 that functions similar to bond coat 104 includes mullite or rare earth silicates.

As described briefly above, multilayer TBC 106 may include first layer 108, second layer 110 and third layer 112, each of which may be selected independently to contribute to the properties of multilayer TBC 106. For example, each of first layer 108, second layer 110 and third layer 112 may be selected from a variety of materials, including yttria-stabilized zirconia, rare earth oxides, alumina, silica, rare earth silicates, titania, alkali metal oxides, alkali earth metal oxides, a rare earth oxide-stabilized zirconia, a rare earth oxide-stabilized hafnia, or combinations thereof.

Yttria-stabilized zirconia includes zirconia ($ZrO_2$) mixed with a minority amount of yttrium oxide ($Y_2O_3$). For example, one yttria-stabilized zirconia composition includes zirconia stabilized by about 7 wt. % to about 8 wt. % yttrium oxide, and is referred to hereafter as 7-8 YSZ.

Rare earth oxides used in at least one of first layer 108, second layer 110 and third layer 112 include, for example, oxides of Lu, Yb, Tm, Er, Ho, Dy, Gd, Tb, Eu, Sm, Pm, Nd, Pr, Ce, La, Y, Sc, and combinations thereof. The same rare earth elements may also be useful when present as rare earth silicates, which include both rare earth monosilicates ($RE_2SiO_5$, where RE is a rare earth element) and rare earth disilicates ($RE_2Si_2O_7$, where RE is a rare earth element).

At least one of first layer 108, second layer 110 and third layer 112 may also include rare earth oxide-stabilized zirconia or rare earth oxide-stabilized hafnia. The zirconia or hafnia may be stabilized by one or more of the rare earth oxides listed above, and in some embodiments, may be stabilized by at least three rare earth oxides. For example, the zirconia or hafnia may be stabilized by a primary dopant, a first co-dopant and a second co-dopant.

As was described briefly above, one purpose of multilayer TBC 106 is to provide thermal insulation for substrate 102 from high temperatures of the turbine gas. Because of this, it is desirable that TBC 106 has a low thermal conductivity (both an intrinsic thermal conductivity of the material(s) that forms multilayer TBC 106 and an effective thermal conductivity of multilayer TBC 106 as constructed). Heat is transferred through multilayer TBC 106 through conduction and radiation. The inclusion of one or more rare earth oxides, such as those described above, as a dopant may help decrease the thermal conductivity (by conduction) of the zirconia- or hafnia-based layer. While not wishing to be bound by any specific theory, the inclusion of at least one of these dopant oxides in the zirconia- or hafnia-based layer may reduce thermal conductivity through one or more mechanisms, as follows.

A first proposed mechanism of reducing thermal conductivity includes introducing lattice imperfections into the crystal structure of the zirconia- or hafnia-based layer. Lattice imperfections include defects in the crystalline lattice of the zirconia or hafnia. The defects may be caused by the incorporation of dopants with differing ionic radii or different crystalline lattice types. Lattice imperfections may be broadly divided into two categories, point defects and larger defects, for the purposes of this discussion. The point defects, such as substitutional defects, interstitial defects, void defects, and the like, may scatter high frequency phonons (lattice waves), while larger defects, such as grain boundaries of crystals that are smaller than about 100 nm, may scatter lower frequency phonons. In either case, phonon scattering decreases the thermal conductivity of the zirconia- or hafnia-based layer by reducing the mean free path of a phonon (i.e., the average distance the phonon travels between scattering sites).

Heavier rare earth oxide dopants are expected to lower the thermal conductivity more than lighter rare earth oxide dopants. For example, rare earth oxides including ytterbium oxide, lutetium oxide, gadolinium oxide, samarium oxide, neodymium oxide, europium oxide, and the like are expected to more effectively lower the thermal conductivity of the zirconia- or hafnia-based layer than yttrium oxide.

Inclusion of certain rare earth elements in the zirconia- or hafnia-based layer may also decrease the extent to which the zirconia- or hafnia-based layer sinters at a given temperature. For example, incorporating a rare earth element with a larger ionic radius than yttrium can decrease the amount of sintering at a given temperature. While not wishing to be bound by any theory, a larger ionic radius can lead to a lower diffusion coefficient at a given temperature. As sintering is primarily a diffusion-related process, a lower diffusion coefficient lowers the amount of sintering at a given temperature.

Minimizing or eliminating sintering may significantly improve the stability of the thermal conductivity of the hafnia- or zirconia-based layer over the service life of multilayer TBC 106. As described above, the thermal conductivity of at least one of layers 108, 110 and 112 of multilayer TBC 106 may be lowered by depositing the at least one layer 108, 110 or 112 as a porous structure. The porosity of the at least one layer 108, 110 or 112 reduces the thermal conductivity by reducing the area through which heat is conducted and by providing a large refractive index difference between the pores and the material from which first layer 108, second layer 110 or third layer 112 is made, which can reduce heat transfer by radiation. Sintering reduces the porosity of the structure, and thus increases the thermal conductivity (via both radiation and conduction) of the at least one layer 108, 110 or 112. Thus, preserving the porosity (i.e., reducing sintering) of the at least one layer 108, 110 or 112 over repeated thermal cycles may help maintain the thermal conductivity of multilayer TBC 106 at or near the level of the originally applied multilayer TBC 106.

In some embodiments, the rare earth oxide-stabilized zirconia or hafnia layer may include a base oxide, a primary dopant, a first co-dopant and a second co-dopant. Including multiple dopants, preferably of different ionic radii, may decrease the thermal conductivity of the rare earth oxide-stabilized zirconia or hafnia layer more than a single dopant when present at the same total concentration. For example, the differing ionic radii may increase the elastic strain field caused by the lattice imperfections.

The base oxide may include or may consist essentially of at least one of zirconia and hafnia. In the current disclosure, to "consist essentially of" means to consist of the listed element(s) or compound(s), while allowing the inclusion of impurities present in small amounts such that the impurities do no substantially affect the properties of the listed element or compound. For example, the purification of many rare earth elements is difficult, and thus the nominal rare earth element may include small amounts of other rare earth elements. This mixture is intended to be covered by the language "consists essentially of." Many conventional TBCs are based on zirconia, so the processing a production of a TBC including zirconia is well understood, but a hafnia-based TBC is expected to have lower thermal conductivity due to a higher mean atomic weight, which is one factor in thermal conductivity.

The composition of the rare earth oxide-stabilized zirconia or hafnia layer may be selected to provide a metastable tetragonal (t') phase constitution, a cubic (c) phase constitution, a compound phase constitution or a mixture of two or more of tetragonal, cubic and compound phase constitutions.

The primary dopant may include ytterbia, or may consist essentially of ytterbia. The rare earth oxide-stabilized zirconia or hafnia layer composition may include the primary dopant in concentrations from about 2 mol. % to about 40 mol. %. In some embodiments, the primary dopant may be present in concentrations ranging from about 2 mol. % to about 20 mol. %, or from about 2 mol. % to about 10 mol. %. The primary dopant is preferably present in a greater amount than either the first or the second co-dopants, and may be present in an amount less than, equal to, or greater than the total amount of the first and second co-dopants. In addition to lowering the thermal conductivity of the rare earth oxide-stabilized zirconia or hafnia layer, ytterbia may provide increased resistance to CMAS degradation.

The first co-dopant in the rare earth oxide-stabilized zirconia or hafnia layer may include or consist essentially of samaria. The rare earth oxide-stabilized zirconia or hafnia layer may include the first co-dopant in concentrations from about 0.1 mol. % to about 20 mol. %. In some embodiments, the first co-dopant may be present in the rare earth oxide-stabilized zirconia or hafnia layer in concentrations from about 0.5 mol. % to about 10 mol. %, or about 0.5 mol. % to about 5 mol. %.

The second co-dopant may include or consist essentially of oxides based on Lu, Sc, Ce, Gd, Nd, Eu, and combinations thereof. The second co-dopant may be present in the rare earth oxide-stabilized zirconia or hafnia layer in an amount ranging from about 0.1 mol. % to about 20 mol. %. In other embodiments, the second co-dopant may be present in the rare earth oxide-stabilized zirconia or hafnia layer in a concentration ranging from about 0.1 mol. % to about 10 mol. %, or about 0.1 mol. % to about 5 mol. %. The first and second co-dopants may reduce the thermal conductivity of the rare earth oxide-stabilized zirconia or hafnia layer.

The composition of the rare earth oxide-stabilized zirconia or hafnia layer may be selected to provide a desired phase constitution. Accessible phase constitutions include meta-stable tetragonal t' (hereafter "tetragonal low k"), cubic (hereafter "cubic low k"), and $RE_2O_3$—$ZrO_2$ (and/or $HfO_2$ compounds, such as $RE_2Zr_2O_7$ and $RE_2Hf_2O_7$ (where RE is a rare earth element; hereafter "compound low k"). To achieve a compound low k phase constitution, the rare earth oxide-stabilized zirconia or hafnia layer may include about 15 mol. % to about 40 mol. % primary dopant, about 5 mol. % to about 20 mol. % first co-dopant, about 5 mol. % to about 20 mol. % second co-dopant, and the balance base oxide and any impurities present. To achieve a cubic low k phase constitution, the rare earth oxide-stabilized zirconia or hafnia layer may include about 4 mol. % to about 20 mol. % primary dopant, about 1 mol. % to about 10 mol. % first co-dopant, about 1 mol. % to about 10 mol. % second co-dopant, and the balance base oxide and any impurities present. To achieve a tetragonal low k phase constitution, the rare earth oxide-stabilized zirconia or hafnia layer may include about 2 mol. % to about 10 mol. % primary dopant, about 0.1 mol. % to about 5 mol. % first co-dopant, and about 0.1 mol. % to about 5 mol. % secondary co-dopant.

Figure 4:
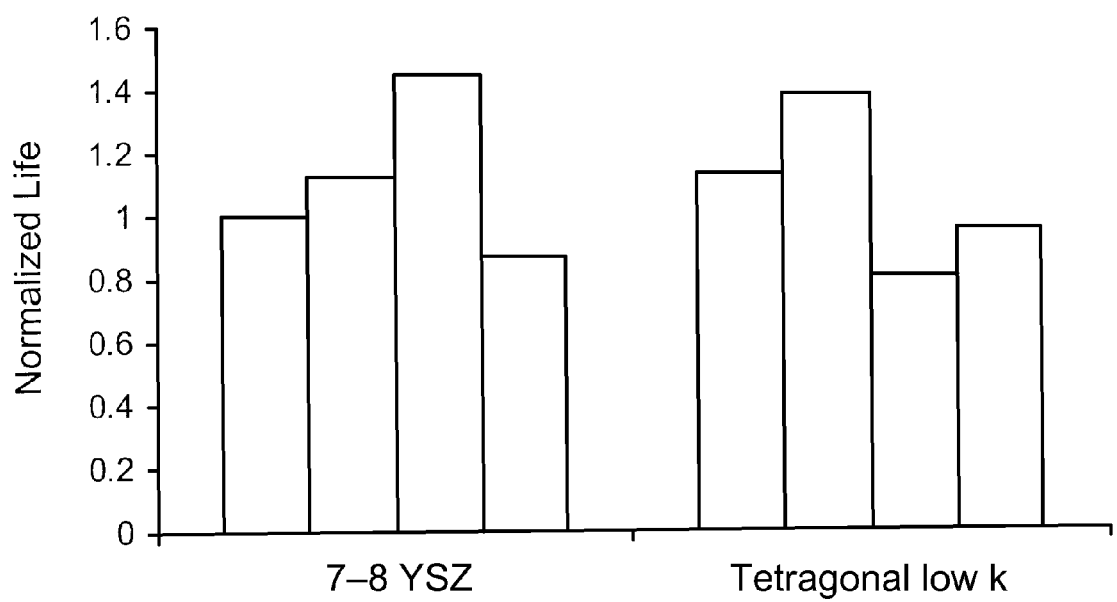
FIG. 4 is a bar diagram comparing the thermal cycling resistance of example oxides.

FIG. 4 illustrates the results of thermal cycling life tests performed on four samples of 7-8 YSZ and four samples of tetragonal low k. As FIG. 4 shows, the normalized thermal cycling life of 7-8 YSZ and tetragonal low k are similar. While not shown in FIG. 4, the thermal cycling life of cubic low k may be significantly lower than either 7-8 YSZ or tetragonal low k.

Figure 5:
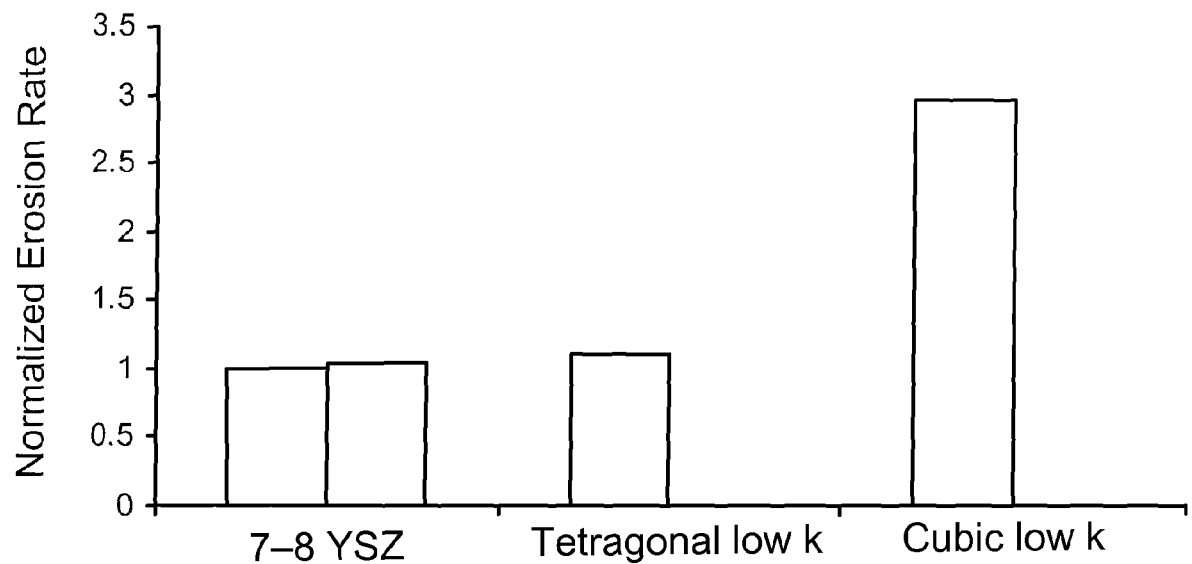
FIG. 5 is a bar diagram comparing the erosion rate of example oxides.

FIG. 5 illustrates the normalized erosion rate of two samples of 7-8 YSZ, one sample of tetragonal low k and one sample of cubic low k. FIG. 5 clearly shows that the erosion rate of 7-8 YSZ and tetragonal low k are similar, while the erosion rate of cubic low k is higher by about a factor of three, which indicates that cubic low k erodes more quickly than both 7-8 YSZ and tetragonal low k.

However, the thermal conductivity of cubic low k is lower than either 7-8 YSZ or tetragonal low k. Thus, in some embodiments, multilayer TBC 106 may advantageously include a layer including cubic low k and a layer including at least one of 7-8 YSZ or tetragonal low k to provide both low thermal conductivity and desirable erosion resistance and desirable thermal cycling resistance.

For example, first layer 108 may be selected to provide a long thermal cycling life for multilayer TBC 106. As described briefly above, thermal cycling refers to thermal expansion and contraction experienced by multilayer TBC 106 when undergoing temperature changes from the use temperature of the article 100 (i.e., the temperature at which a gas turbine engine operates) to ambient temperature (when the gas turbine engine is not operating). Presently available evidence indicates that the thermal cycling life of a material may be influenced by the fracture toughness of the material, and higher fracture toughness may lead to a longer thermal cycling life. In some embodiments, first layer 108 may include at least one of 7-8 YSZ and tetragonal low k, which possess similar thermal cycling resistance, as shown above in FIG. 4.

Second layer 110 may be selected to provide low thermal conductivity to multilayer TBC 106. As described above, any of tetragonal low k, cubic low k and compound low k provide low thermal conductivity due to the inclusion of rare earth oxides as dopants. In fact, the thermal conductivity of the tetragonal low k, cubic low k and compound low k is expected to be comparable to or lower than 7-8 YSZ or other TBC materials. Accordingly, second layer 110 may include at least one of tetragonal low k, cubic low k and compound low k, and may include combinations thereof. In some embodiments, second layer 110 may include predominantly cubic low k or consist essentially of cubic low k, as cubic low k may provide even lower thermal conductivity than tetragonal low k and compound low k.

Third layer 112 may be selected to provide at least one of erosion resistance and CMAS degradation resistance. As illustrated above in FIG. 5, tetragonal low k and 7-8 YSZ have similar erosion rates, which may be lower than the erosion rate of cubic low k. Accordingly, in some embodiments, third layer 112 may comprise at least one of tetragonal low k and 7-8 YSZ to provide erosion resistance for multilayer TBC 106.

In some embodiments, third layer 112 may be selected to provide CMAS degradation resistance, in addition to erosion resistance or instead of erosion resistance. Third layer 112 may provide CMAS degradation resistance by providing a physical barrier to CMAS, by reacting with CMAS to form a reaction layer, or both. For example, third layer 112 may include any element that reacts with CMAS to form a solid or a highly viscous reaction product (i.e., a reaction product that is a solid or is highly viscous at the temperatures experienced by article 100). The reaction product may have a melting temperature significantly higher than CMAS (e.g., higher than about 1200-1250° C.). A solid or highly viscous reaction product is desired because third layer 112 may be consumed as it reacts with CMAS to form the reaction layer. If, for example, the reaction product of third layer 112 and CMAS was a relatively low viscosity liquid, the low viscosity liquid would infiltrate the porous multilayer TBC 106 once third layer 112 was consumed by the reaction, which is the very occurrence a third layer 112 which provides CMAS degradation resistance is designed to prevent.

If the reaction product is a solid or is highly viscous, however, a reaction layer will form on the surface of third layer 112, which will lower the reaction rate of the CMAS with third layer 112. That is, once a solid or highly viscous reaction layer forms on the surface of third layer 112, the reaction between third layer 112 and CMAS will slow, because any further reaction will require diffusion of CMAS through the reaction layer to encounter third layer 112 or diffusion of a component of third layer 112 through the reaction layer to encounter the CMAS. In either case, diffusion is expected to be the limiting step in the reaction once a solid or highly viscous reaction layer is formed on the surface of third layer 112.

Third layer 112 may include, for example, at least one of alumina, silica, a rare earth oxide, a rare earth silicate, titania, an alkali metal oxide, an alkali earth metal oxide, and may include combinations of two or more of these constituents. Further details regarding CMAS degradation resistant layers may be found in U.S. patent application Ser. No. 12/016,649 to Lee, entitled "CMAS-Resistant Thermal Barrier Coatings," the content of which is incorporated herein by reference in its entirety.

Each of first layer 108, second layer 110 and third layer 112 may be deposited using a wide variety of coating techniques, including, for example, plasma spraying, physical vapor deposition (PVD) such as EB-PVD (electron beam physical vapor deposition) or DVD (directed vapor deposition), cathodic arc deposition, chemical vapor deposition (CVD), slurry dip coating, sol-gel coating, electrophoretic deposition, and combinations thereof. For example, first layer 108 may be deposited using a first coating technique, second layer 110 may be deposited using a second, different coating technique, and third layer 112 may be deposited using a third coating technique, which is different from both the first coating technique and the second coating technique. In other embodiments, each of first layer 108, second layer 110 and third layer 112 may be deposited sequentially using the same coating technique.

Figure 6:
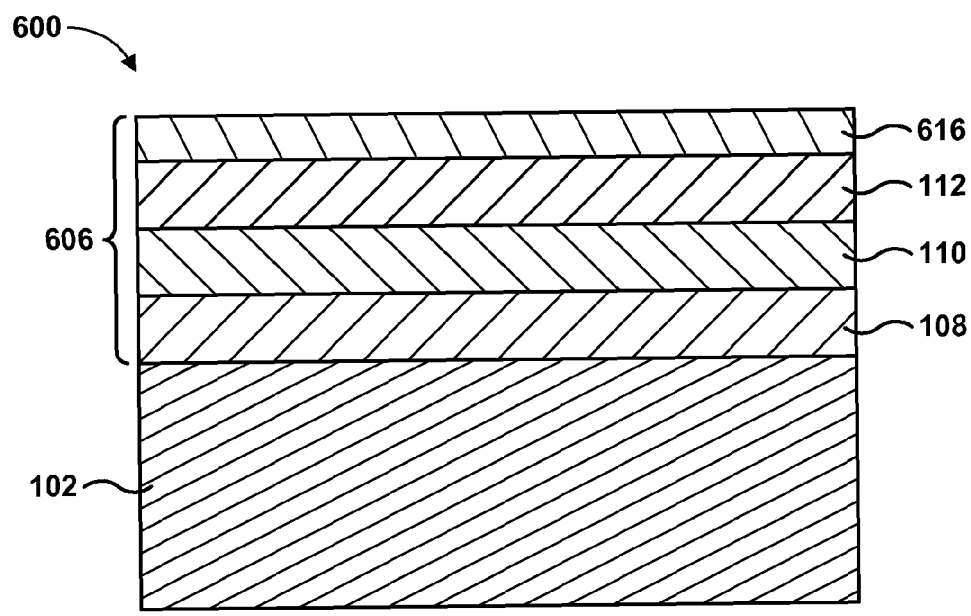
FIG. 6 is a cross-sectional diagram illustrating an example article including a CMAS degradation resistant layer deposited over a multilayer thermal barrier coating.

In other embodiments, an article 600 may include a multilayer TBC 606 that includes first layer 108, second layer 110, third layer 112, and a fourth layer 616, as illustrated in FIG. 6. Each of first layer 108, second layer 110 and third layer 112 may be selected based on the considerations described above, including, for example thermal conductivity, erosion resistance, thermal cycling resistance and CMAS degradation resistance. Fourth layer 616 may be selected to provide CMAS degradation resistance. For example, fourth layer 616 may include at least one of a rare earth oxide, alumina, silica, a rare earth silicate, titania, an alkali metal oxide, an alkali earth metal oxide, and may include combinations of two or more of these constituents, as described in further detail above.

Figure 7:
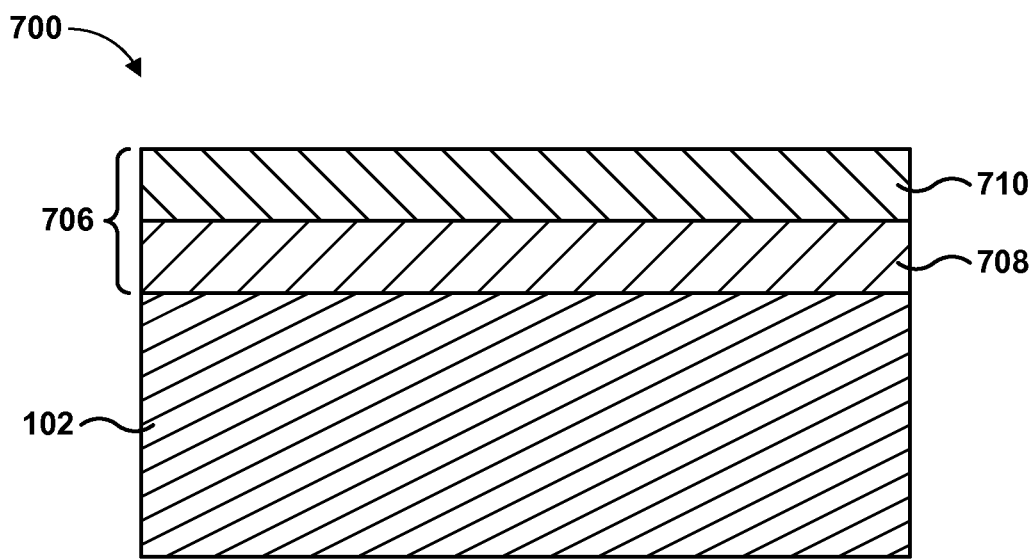
FIG. 7 is a cross-sectional diagram illustrating an example article including a two-layer thermal barrier coating.

In yet other embodiments, an article 700 may include a two-layer TBC 706 that includes a first layer 708 and a second layer 710. Two-layer TBC 706 may be deposited directly on substrate 102, as illustrated in FIG. 7, or may be deposited over substrate 102 with one or more intermediate layers, which may include a bond coat, an EBC, or both, as described above.

Each of first layer 708 and second layer 710 may be selected to provide desired properties to the two-layer TBC 706. For example, first layer 708 may be selected to provide thermal cycling resistance, and may include 7-8 YSZ or tetragonal low k. In other embodiments, first layer 708 may be selected to provide low thermal conductivity, and may include 7-8 YSZ, tetragonal low k, cubic low k. or compound low k.

Second layer 710 may be selected to provide, for example, erosion resistance, CMAS degradation resistance, and/or low thermal conductivity. Second layer 710 may include, for example, tetragonal low k, cubic low k, compound low k, 7-8 YSZ, or at least one of a rare earth oxide, alumina, silica, a rare earth silicate, titania, an alkali metal oxide, an alkali earth metal oxide. In some embodiments, second layer 710 may include combinations of two or more of these constituents. A composition of second layer 710 may be different than a composition of first layer 708 in some embodiments.

In some preferred embodiments, first layer 708 may include tetragonal low k and second layer 710 may include cubic low k. In other preferred embodiments, first layer 708 may include cubic low k and second layer 710 may include tetragonal low k. In other preferred embodiments, first layer 708 may include tetragonal low k, and second layer 710 may include at least one of a rare earth oxide, alumina, silica, a rare earth silicate, titania, an alkali metal oxide, an alkali earth metal oxide, and may include combinations of two or more of these constituents.

Figure 8:
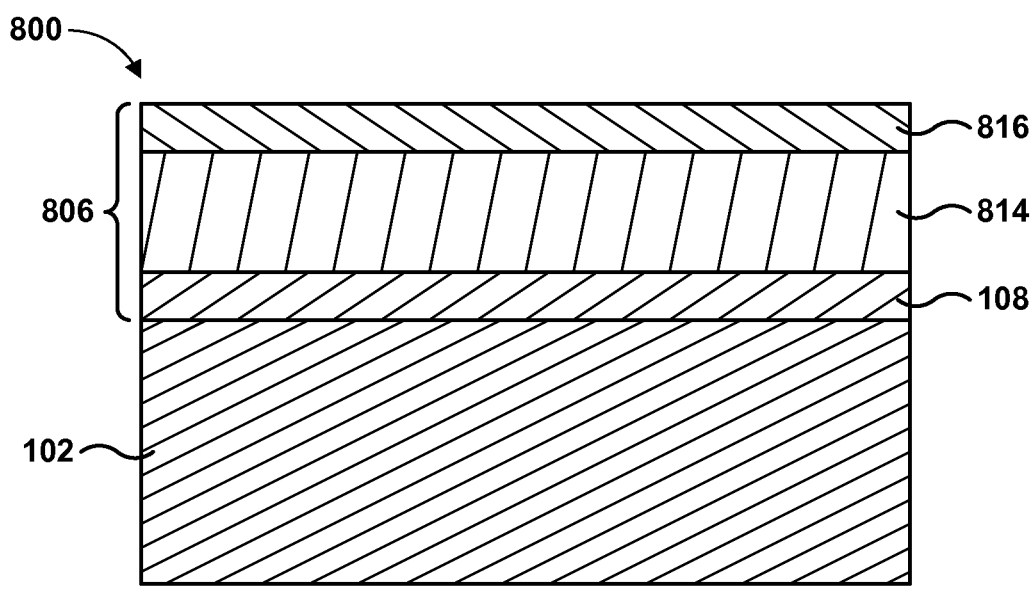
FIG. 8 is a cross-sectional diagram illustrating an example article including a multilayer thermal barrier coating including a multilayered intermediate layer.

In other embodiments, an article 800 may include a multilayer TBC 806 that includes first layer 108, a multilayer intermediate layer 814 deposited over first layer 108, and a top layer 816 deposited over multilayer intermediate layer 814, as illustrated in FIG. 8. First layer 108 may be deposited over or directly on substrate 102, and in some embodiments, may be deposited over or directly on at least one of a bond coat 104 or an EBC 314.

Multilayered intermediate layer 814 may include as many layers as practicable. For example, multilayered intermediate layer 814 may include at least two layers, and may include significantly more than two layers.

Each of first layer 108, multilayered intermediate layer 814 and top layer 816 may be selected based on at least one of the considerations described above, including, for example thermal conductivity, erosion resistance, thermal cycling resistance and CMAS degradation resistance. In some embodiments, one or more layers of multilayered intermediate layer 814 may be selected to provide low thermal conductivity and/or erosion resistance. For example, multilayered intermediate layer 814 may include one or more layer that includes at least one of tetragonal low k, cubic low k, compound low k, 7-8 YSZ, and a rare earth silicate. In some embodiments, at least one layer in multilayered intermediate layer 814 may include combinations of two or more of these constituents, as described in further detail above.

In some embodiments, top layer 816 may be selected to provide CMAS degradation resistance. For example, top layer 816 may include at least one of a rare earth oxide, alumina, silica, a rare earth silicate, titania, an alkali metal oxide, an alkali earth metal oxide, and may include combinations of two or more of these constituents, as described in further detail above.

Various embodiments have been described. These and other embodiments are within the scope of the following claims.

The invention claimed is:

1. A thermal barrier coating comprising:
   a first layer deposited over a substrate, wherein the first layer comprises:
      a base oxide comprising at least one of zirconia and hafnia,
      a primary dopant comprising ytterbia,
      a first co-dopant comprising samaria, and
      a second co-dopant comprising at least one of lutetia, scandia, ceria, gadolinia, neodymia and europia;
   a second layer deposited over the first layer, wherein the second layer comprises at least one of:
      a $RE_2Zr_2O_7$, wherein RE comprises a combination of ytterbia, samaria and at least one of lutetia, scandia, ceria, gadolinia, neodymia and europia or;
      a $RE_2Hf_2O_7$, wherein RE comprises a combination of ytterbia, samaria and at least one of lutetia, scandia, ceria, gadolinia, neodymia and europia; and
   a third layer deposited over the second layer, comprises at least one of 7-8 yttria-stabilized zirconia, a rare earth oxide, alumina, silica, a rare earth silicate, titania, an alkali metal oxide, and an alkali earth metal oxide.

2. The thermal barrier coating of claim 1, wherein the first layer comprises a metastable tetragonal phase constitution.

3. The thermal barrier coating of claim 1, wherein the second layer further comprises:
the base oxide comprising the at least one of zirconia and hafnia;
the primary dopant comprising ytterbia;
the first co-dopant comprising samaria; and
the second co-dopant comprising the at least one of lutetia, scandia, ceria, gadolinia, neodymia and europia.

4. The thermal barrier coating of claim 3, wherein the second layer comprises a metastable tetragonal phase constitution.

5. The thermal barrier coating of claim 3, wherein the second layer comprises a cubic phase constitution.

6. The thermal barrier coating of claim 1, wherein the third layer comprises:
a base oxide comprising at least one of zirconia and hafnia;
a primary dopant comprising ytterbia;
a first co-dopant comprising samaria; and
a second co-dopant comprising at least one of lutetia, Scandia, ceria, gadolinia, neodymia and europia, and wherein the third layer comprises a metastable tetragonal phase constitution.

7. The thermal barrier coating of claim 1, further comprising a fourth layer deposited over a third layer, wherein the fourth layer comprises at least one of a rare earth oxide, alumina, silica, a rare earth silicate, titania, an alkali metal oxide, an alkali earth metal oxide.

8. An article comprising:
a substrate comprising at least one of a superalloy, a ceramic, or a ceramic matrix composite; and
a thermal barrier coating deposited over the substrate, wherein the thermal barrier coating comprises:
a first layer deposited over the substrate, wherein the first layer comprises:
a base oxide comprising at least one of zirconia and hafnia,
a primary dopant comprising ytterbia,
a first co-dopant comprising samaria, and
a second co-dopant comprising at least one of lutetia, scandia, ceria, gadolinia, neodymia and europia;
a second layer deposited over the first layer, wherein the second layer possesses low thermal conductivity comprises at least one of:
a $RE_2Zr_2O_7$, wherein RE comprises a combination of ytterbia, samaria and at least one of lutetia, scandia, ceria, gadolinia, neodymia and europia; or
a $RE_2Hf_2O_7$, wherein RE comprises a combination of ytterbia, samaria and at least one of lutetia, scandia, ceria, gadolinia, neodymia and europia; and
a third layer deposited over the second layer.

9. The article of claim 8, further comprising a bond coat deposited over the substrate, wherein the first layer is deposited over the bond coat.

10. The article of claim 9, further comprising an environmental barrier coating deposited over the bond coat, wherein the first layer is deposited over the environmental barrier coating.

11. The article of claim 8, further comprising an environmental barrier coating deposited over the substrate, wherein the first layer is deposited over the environmental barrier coating.

12. The article of claim 8, further comprising a fourth layer deposited over the third layer, wherein the fourth layer comprises at least one of a rare earth oxide, alumina, silica, a rare earth silicate, titania, an alkali metal oxide and an alkali earth metal oxide.

13. The article of claim 12, wherein the fourth layer comprises the rare earth oxide and alumina.

14. The article of claim 8, wherein the first layer comprises:
a base oxide consisting essentially of at least one of zirconia and hafnia;
a primary dopant consisting essentially of ytterbia;
a first co-dopant consisting essentially of samaria; and
a second co-dopant consisting essentially of at least one of lutetia, scandia, ceria, gadolinia, neodymia and europia, wherein the first layer comprises a metastable tetragonal phase constitution.

15. The article of claim 8, wherein the second layer comprises the $RE_2Hf_2O_7$.

16. The article of claim 8, wherein the third layer comprises at least one of 7-8 yttria-stabilized zirconia, a rare earth oxide, alumina, silica, a rare earth silicate, titania, an alkali metal oxide and an alkali earth metal oxide.

17. The article of claim 8, wherein the third layer comprises:
a base oxide comprising at least one of zirconia and hafnia;
a primary dopant comprising ytterbia;
a first co-dopant comprising samaria; and
a second co-dopant comprising at least one of lutetia, Scandia, ceria, gadolinia, neodymia and europia, and wherein the third layer comprises a metastable tetragonal phase constitution.

18. A multilayer thermal barrier coating comprising:
a first layer deposited over a substrate, wherein the first layer comprises at least one of:
7-8 yttria-stabilized zirconia, and
a base oxide comprising at least one of zirconia and hafnia, a primary dopant comprising ytterbia, a first co-dopant comprising samaria, and a second co-dopant comprising at least one of lutetia, Scandia, ceria, gadolinia, neodymia and europia;
a multilayer intermediate layer, wherein the multilayer intermediate layer comprises a plurality of layers, and wherein at least one of the plurality of layers comprises at least one of:
$RE_2Zr_2O_7$ and $RE_7Hf_2O_7$, wherein RE comprises a combination of ytterbia, samaria and at least one of lutetia, scandia, ceria, gadolinia, neodymia and europia; and
a top layer, wherein the top layer comprises at least one of a rare earth oxide, alumina, silica, a rare earth silicate, titania, an alkali metal oxide, an alkali earth metal oxide.

19. The multilayer thermal barrier coating of claim 18, wherein at least one other of the layers of the multilayer intermediate layer comprises at least one of:
7-8 yttria-stabilized zirconia;
a rare earth silicate; and
a base oxide comprising at least one of zirconia and hafnia, a primary dopant comprising ytterbia, a first co-dopant comprising samaria, and a second co-dopant comprising at least one of lutetia, Scandia, ceria, gadolinia, neodymia and europia, wherein the first layer comprises a first phase constitution selected from a metastable tetragonal phase constitution and a cubic phase constitution.

20. The multilayer thermal barrier coating of claim 18, wherein the first layer comprises
a base oxide comprising at least one of zirconia and hafnia, a primary dopant comprising ytterbia, a first co-dopant comprising samaria, and a second co-dopant comprising at least one of lutetia, Scandia, ceria, gadolinia, neodymia and europia.

21. The multilayer thermal barrier coating of claim 18, wherein the top layer comprises the rare earth oxide and alumina.

* * * * *